(12) United States Patent
Iwamori et al.

(10) Patent No.: US 7,281,095 B2
(45) Date of Patent: Oct. 9, 2007

(54) MEMORY DEVICE CONTROL SYSTEM

(75) Inventors: Kouichi Iwamori, Osaka (JP); Ikuko Fujinawa, Kyouto (JP); Yoshimasa Obayashi, Kyouto (JP); Kenichi Kawaguchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 681 days.

(21) Appl. No.: 10/751,659

(22) Filed: Jan. 6, 2004

(65) Prior Publication Data
US 2005/0027949 A1    Feb. 3, 2005

(30) Foreign Application Priority Data
Jan. 6, 2003    (JP)    ............................ P.2003-000435

(51) Int. Cl.
*G06F 12/00*    (2006.01)
(52) U.S. Cl. ........................ 711/150; 711/151; 711/153; 711/167; 711/168
(58) Field of Classification Search ............... None
See application file for complete search history.

(56) References Cited

U.S. PATENT DOCUMENTS

| | | | |
|---|---|---|---|
| 5,432,923 A * | 7/1995 | Taniguchi et al. ............. 711/2 |
| 5,819,276 A * | 10/1998 | Cai et al. ..................... 707/100 |
| 5,909,693 A | 6/1999 | Martini | |
| 5,963,963 A | 10/1999 | Schmuck et al. | |
| 6,023,720 A * | 2/2000 | Aref et al. ................... 718/103 |
| 6,247,104 B1 * | 6/2001 | Suzuki ........................ 711/167 |
| 6,526,431 B1 * | 2/2003 | Bigbee et al. .............. 718/108 |
| 6,853,382 B1 * | 2/2005 | Van Dyke et al. .......... 345/544 |
| 6,925,545 B2 * | 8/2005 | March et al. ................ 711/170 |
| 7,007,138 B2 * | 2/2006 | Mochida et al. ............. 711/151 |
| 2003/0033493 A1 * | 2/2003 | Cismas ....................... 711/158 |
| 2004/0019749 A1 * | 1/2004 | Mochida et al. ............. 711/151 |
| 2004/0103099 A1 * | 5/2004 | Minagawa ................... 707/10 |
| 2004/0117547 A1 * | 6/2004 | Ogihara et al. ............. 711/112 |
| 2004/0123059 A1 * | 6/2004 | Suda ........................... 711/163 |

* cited by examiner

*Primary Examiner*—Gary Portka
*Assistant Examiner*—Kaushik Patel
(74) *Attorney, Agent, or Firm*—McDermott Will & Emery LLP

(57) ABSTRACT

Even if a plurality of tasks that access a plurality of data areas each having the different control method are operated in parallel and the access requests are generated almost simultaneously, the simultaneous accesses to the memory device can be prevented and also a plurality of tasks can be operated in parallel while maintaining a real-time characteristic since the access request contained in the tasks are divided into partial request units by the access-request mediating portion to switch the access requests.

31 Claims, 20 Drawing Sheets

FIG. 3

ARGUMENT FROM FS

| 301 | 302 |
|---|---|
| ACCESS-STARTING SECTOR NUMBER | NUMBER OF ACCESS SECTORS |

FIG. 4

| | TASK A | TASK B | | | | |
|---|---|---|---|---|---|---|
| 402 ACCESS-STARTING SECTOR NUMBER | 10 | 300 | | | | |
| 403 NUMBER OF REMAINING ACCESS SECTORS | 32 | 150 | | | | |
| 404 ACCESS DEMANDANT INFORMATION | A | B | | | | |

↗ 203

{ NUMBER OF TASKS THAT CAN BE OPERATED SIMULTANEOUSLY IN SYSTEM

FIG. 9

ARGUMENT FROM FS

| ACCESS-STARTING SECTOR NUMBER (301) | NUMBER OF ACCESS SECTORS (302) | ALLOWABLE DELAY VALUE (903) |
|---|---|---|

FIG. 14

ARGUMENT FROM FS

| 301 | 302 | 1403 |
|---|---|---|
| ACCESS-STARTING SECTOR NUMBER | NUMBER OF ACCESS SECTORS | PRIORITY INFORMATION |

FIG. 15

| | TASK A | TASK B | | | |
|---|---|---|---|---|---|
| ACCESS-STARTING SECTOR NUMBER | 10 | 100 | | | |
| NUMBER OF REMAINING ACCESS SECTORS | 32 | 100 | | | |
| ACCESS DEMANDANT INFORMATION | A | B | | | |
| PRIORITY INFORMATION | 1 | 3 | | | |

402 — ACCESS-STARTING SECTOR NUMBER
403 — NUMBER OF REMAINING ACCESS SECTORS
404 — ACCESS DEMANDANT INFORMATION
1505 — PRIORITY INFORMATION

1303

* PRIORITY CAN BE SET TO 0 TO 255 STAGES, AND 0 IS HIGHEST PRIORITY

FIG. 19

ARGUMENT FROM FS

| 301 | 302 | 2103 |
|---|---|---|
| ACCESS-STARTING SECTOR NUMBER | NUMBER OF ACCESS SECTORS | NUMBER OF ACCESS SECTOR UNITS |

FIG. 20

| | TASK A | TASK B | | | | | |
|---|---|---|---|---|---|---|---|
| ACCESS-STARTING SECTOR NUMBER | 10 | 300 | | | | | |
| NUMBER OF REMAINING ACCESS SECTORS | 32 | 150 | | | | | |
| ACCESS SECTOR UNIT NUMBER | 10 | 30 | | | | | |
| ACCESS DEMANDANT INFORMATION | A | B | | | | | |

2003

402 — ACCESS-STARTING SECTOR NUMBER
403 — NUMBER OF REMAINING ACCESS SECTORS
2204 — ACCESS SECTOR UNIT NUMBER
404 — ACCESS DEMANDANT INFORMATION

NUMBER OF TASKS THAT CAN BE OPERATED SIMULTANEOUSLY IN SYSTEM

MEMORY DEVICE CONTROL SYSTEM

BACKGROUND OF THE INVENTION

1. Field of the Invention

The present invention relates to a memory device control system for accessing a memory device that has a plurality of data areas each control method of which is different.

2. Description of the Related Art

In the prior art, since all areas of one memory device are operated by the same control method, one file system was provided. In such memory device, even in such a environment that two tasks or more that are going to execute the access process can be operated in parallel, it was a normal method that, since only one file system is provided, the mediating process applied to access one memory device in parallel was carried out by this one file system.

Here, in the memory device such as the hard disk, etc., the "file system" means such a system that manages the information indicating what files are stored in which locations of the memory device. In the file system, the methods of making files or directories in the memory device, the data recording system, locations of the management area, the application method, etc. are decided. As the typical file system, there are FAT, NTFS, etc.

Meanwhile, in recent years, the memory device having a plurality of data areas the control method of which is different respectively are employed. For example, when the memory device such as the memory card, or the like is employed in the built-in device, the secured data areas and the unsecured data areas, to which different control methods are applied respectively, are provided to the memory card in order to attain the security reinforcement of the memory card.

Since the control methods are different in the secured data areas and the unsecured data areas, two types of file systems must be used to implement the access process applied to the memory card. In this manner, in order to access to the memory device having a plurality of data areas the control method of which is different respectively, the file systems that are different mutually must be prepared every different data area respectively to execute the access process.

As the technique for accessing to one memory device from two types or more of file systems, there is the file management system that is able to absorb differences in different file systems (see JP-A-9-128277). According to this system, differences are absorbed by converting file accesses, which have different protocols of plural OS's, into the protocol of the particular OS.

However, according to the technique set forth in Patent Literature 1, for example, when a plurality of tasks are going to access one memory device in which a plurality of data areas having the different control method cannot be accessed simultaneously, the mediation that takes account of all the access requests issued to a plurality of files system must be carried out. Therefore, such mediation must be carried out at a task level.

When a plurality of tasks are operated in parallel and different data areas are accessed simultaneously via a plurality of file systems, other tasks cannot access other data areas at all based on the mediation at a task level during when one task is being to access the data area Actually, when the mediation at a task level is carried out, the processing unit used to access the memory device depends on the file system, and thus it is not feasible to operate a plurality of tasks in parallel by using the different file systems. As a result, it was impossible to operate a plurality of tasks simultaneously by using the data stored in different data areas.

For instance, in the multitask system, when the music file in which the media player task is stored in the secured data area of the memory card is read on occasion to output the music, the music output is carried out as one task. Therefore, such a problem existed that the file viewer task cannot display contents of the text file, which is stored in the unsecured data area of the memory card, during the playing of the music.

SUMMARY OF THE INVENTION

The present invention has been made to overcome the above problems, and it is an object of the present invention to provide a memory device control system capable of causing a plurality of tasks to operate in parallel effectively while maintaining a real time performance when a plurality of tasks are going to access respective areas, which have a different control method respectively, of a memory device that has a plurality of data areas, each control method of which is different, in the multitask system.

In order to overcome the above problems, a memory device control system according to Claim 1 for accessing a memory device having a plurality of data areas that require a different control method, comprises a plurality of different file systems provided to respond to each of the plurality of data areas to control tasks containing access requests to files in the data areas; a plurality of device control portions provided to respond to each of the plurality of data areas to accept the access requests and access the memory device; and an access-request mediating portion for mediating the access requests when a plurality of tasks containing the access requests are executed simultaneously.

According to the above configuration, since the access-request mediating portion mediates the access requests to the data areas that require a different control method, these tasks can be executed simultaneously even if a plurality of tasks containing the access requests issued to a plurality of data areas employ the file systems that use the different control methods respectively.

In the memory device control system according to Claim 2, in the memory device control system set forth in Claim 1, the access-request mediating portion divides the access requests into partial requests and mediates the accesses every partial request.

According to the above configuration, since the access-request mediating portion divides the access requests contained in the tasks into partial request units and issues them to the device control portion, the access request can be switched to the memory device access in another task not to wait the end of the memory device access in one task. As a result, a plurality of tasks containing the access requests issued to a plurality of different data areas can be executed in parallel.

In the memory device control system according to Claim 3, in the memory device control system set forth in Claim 2, when the access requests are divided into partial requests, the access requests are divided into predetermined split sizes.

According to the above configuration, since the access requests are divided into partial requests in predetermined split size, split/mediation of a plurality of access requests can be achieved with a simple configuration by allocating an appropriate split size to the partial requests.

In the memory device control system according to Claim 4, in the memory device control system set forth in Claim 3, a number S of sectors in split size is calculated by $$T\max/N = C1 \times S + C2$$

where N (N is an integer of 2 or more) is a maximum number of tasks that are operated simultaneously, Tmax is a predetermined allowable maximum access delay time, C1 is an estimated time required to access one sector, and C2 is an estimated time required for an overhead of one access.

According to the above configuration, since the task having the shortest allowable access interval time is selected previously from the tasks that must be operated in the multitask system and then the split size S is calculated previously based on the calculating formula by assuming the access interval time as the maximum allowable access delay time Tmax, all the tasks can be operated in parallel not to disturb the process that requires a real-time performance, e.g., the media processing, etc.

In the memory device control system according to Claim 5, in the memory device control system set forth in Claim 2, when the access requests are divided into partial requests, the access requests are divided into calculated split sizes by looking up allowable access delay times that are set every task.

According to the above configuration, since the split size can be calculated dynamically by looking up the allowable access delay time of each task that is now in operation, the split size can be varied to meet to the task that is currently in operation, and also a plurality of tasks can be operated in parallel more effectively.

In the memory device control system according to Claim 6, in the memory device control system set forth in Claim 5 a number S of sectors in split size is calculated by $$L/M = C1 \times S + C2$$

where M (M is an integer of 2 or more) is a number of tasks that are operated simultaneously, L is a minimum value of allowable access delay times that are set every M tasks, C1 is an estimated time required to access one sector, and C2 is an estimated time required for an overhead of one access.

According to the above configuration, since the split size S is calculated based on the calculation formula using the minimum value L of the allowable access delay times that are set every M tasks that are currently in operation, the split sizes can be decided to maintain a real-time characteristic of the task that is executed currently, and thus a plurality of tasks can be operated in parallel effectively.

In the memory device control system according to Claim 7, in the memory device control system set forth in Claim 4 or 6, when the access requests are divided into partial requests, the access-request mediating portion acquires a value of the estimated time C1 required to access one sector every data area and then calculates the split size S by using the value of the acquired C1.

According to the above configuration, since the split size can be calculated to meet the access speed when such access speed becomes different every data area, the finer access control can be executed to fit to the characteristic of the memory device.

In the memory device control system according to Claim 8, in the memory device control system set forth in Claim 2, when the access requests are divided into partial requests, the access requests are divided in unit of a predetermined time.

According to the above configuration, since the access requests are switched in unit of predetermined time by utilizing the timer, the switching of the task can be carried out for a constant time without fail.

In the memory device control system according to Claim 9, in the memory device control system set forth in Claim 2, when the access requests are divided into partial requests, the access requests are divided into access sizes that are set every task.

According to the above configuration, since the split size can be designated every task, the memory device can be accessed more effectively. Also, the split size can be designated according to the application of the task, the task design with a wide margin can be achieved.

In the memory device control system according to Claim 10, in the memory device control system set forth in Claim 1, the access-request mediating portion accesses the memory device in order of priorities that are allocated to respective tasks.

According to the above configuration, since the priority is assigned to the task that receives the access request, the memory device access can be preferentially processes in response to the characteristics of individual tasks. For example, if the task that is accessed absolutely preferentially is present, the access of the task can be always processed preferentially.

BRIEF DESCRIPTION OF THE DRAWINGS

FIG. 3 is a view showing a configuration of attached information of the access requests in the first embodiment of the present invention.

FIG. 4 is a view showing a configuration of an access information table in the first embodiment of the present invention.

FIG. 9 is a view showing a configuration of attached information of the access requests in the second embodiment of the present invention.

FIG. 14 is a view showing a configuration of attached information of the access request in the third embodiment of the present invention.

FIG. 15 is a view showing a configuration of an access information table in the third embodiment of the present invention.

FIG. 19 is a view showing a configuration of attached information of the access request in the fifth embodiment of the present invention.

FIG. 20 is a view showing a configuration of an access information table in the fifth embodiment of the present invention.

DESCRIPTION OF THE PREFERRED EMBODIMENTS

Embodiments of the present invention will be explained with reference to the drawings hereinafter. First, a memory device control system having a plurality of areas in a first embodiment of the present invention will be explained with reference to FIG. 1 to FIG. 7.

Figure 1:
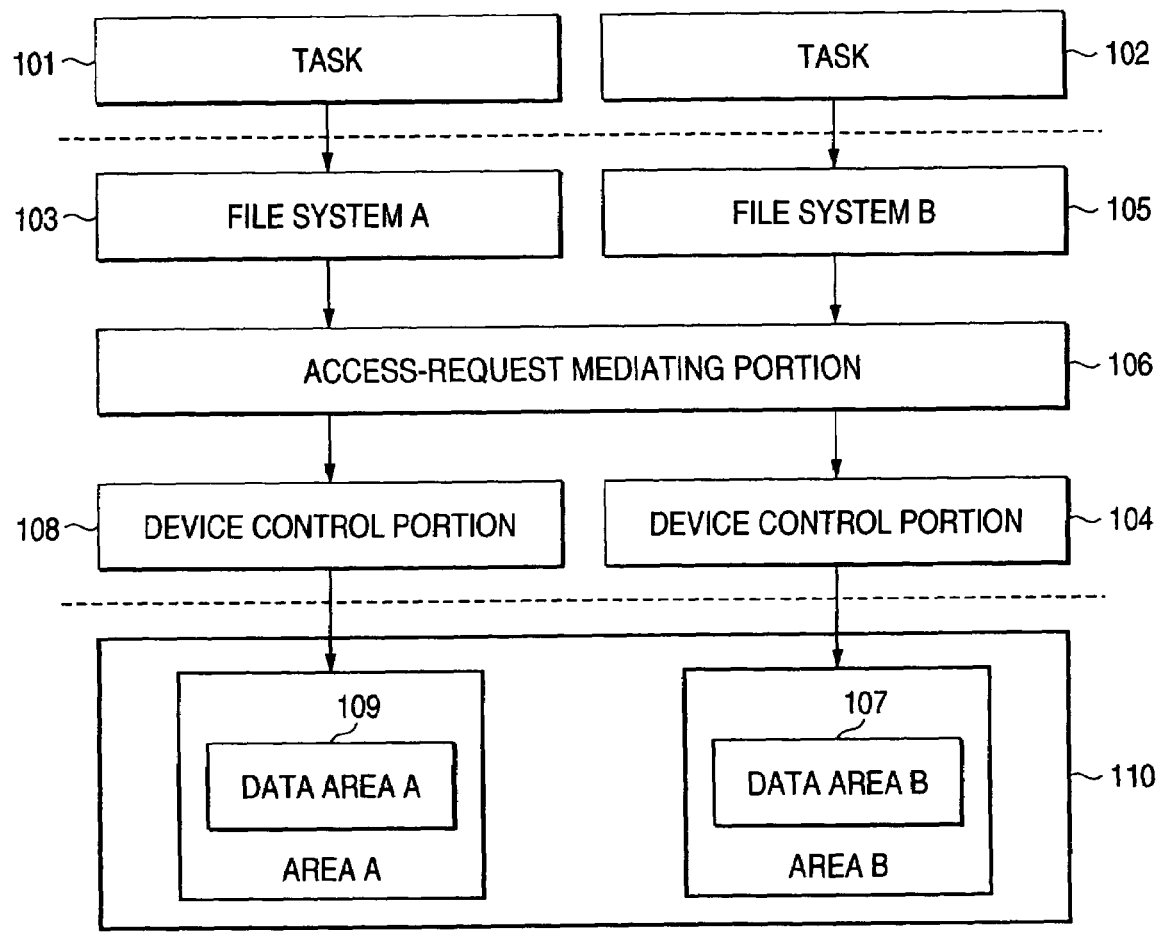
FIG. 1 is a block diagram showing a memory device having a plurality of data areas and an overall configuration of a memory device control system according to embodiments of the present invention.

FIG. 1 is a block diagram showing a memory device having a plurality of data areas and an overall configuration of a memory device control system according to embodiments of the present invention. In FIG. 1, 110 denotes a memory device, and has two data areas 109 and 107 the control method of which is different. Also, 101 and 102 denote a task respectively, and execute the access to two different data areas 109 and 107 simultaneously respectively.

In the memory device control system, 103 and 105 are two different file systems, and access files in corresponding data areas 109 and 107 respectively. Also, 106 is an access-request mediating portion, and carried out the mediation between the accesses by using attached information of the access request issued from the file system 103 or the file system 105 when the accesses to the different data areas 109 and 107 occur. Also, 108 and 104 are a device control portion respectively, and actually access a memory device 110 to control the device.

Figure 2:
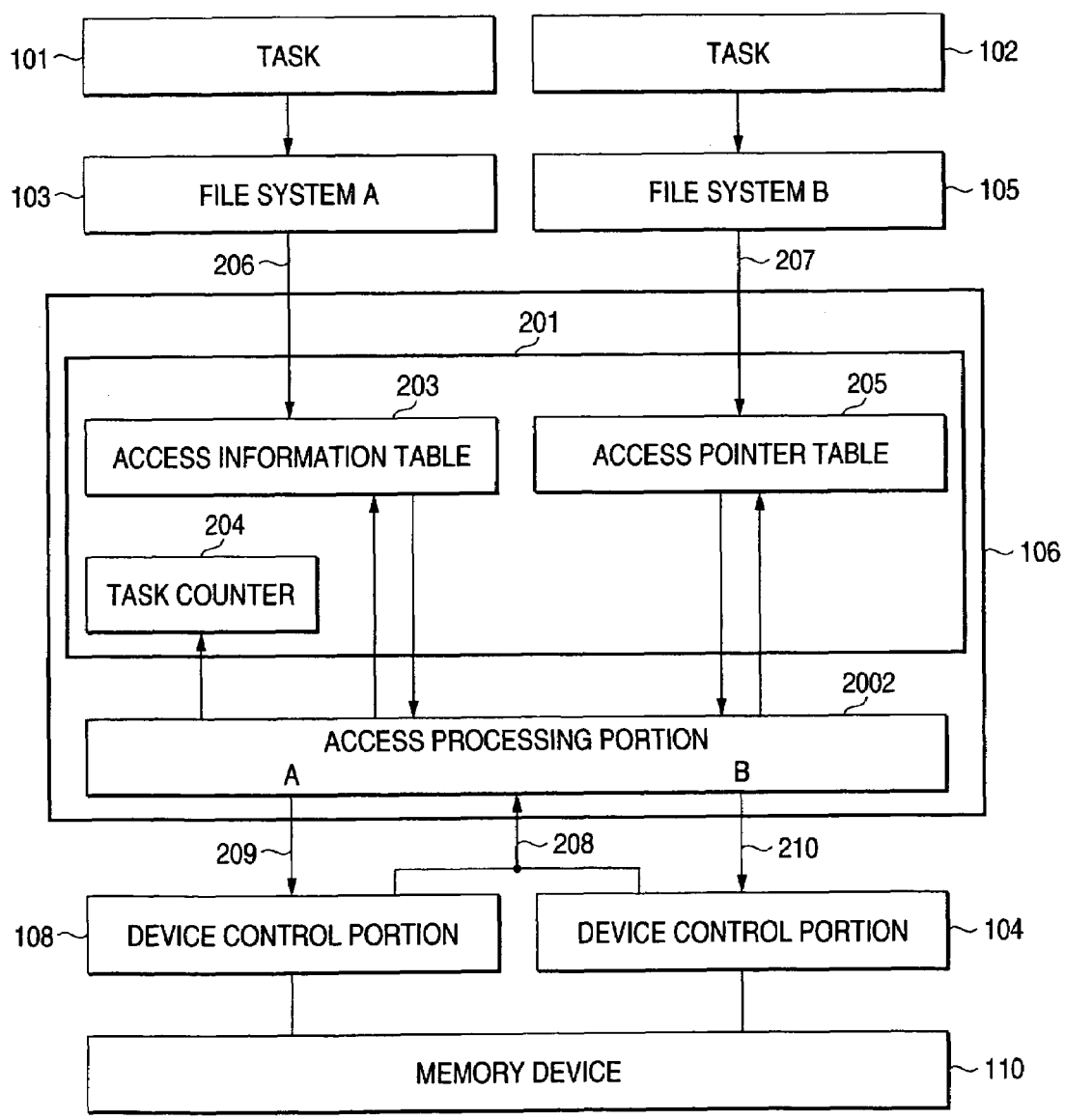
FIG. 2 is a block diagram showing a configuration of an access-request mediating portion according to a first embodiment of the present invention.

FIG. 2 is a block diagram showing a configuration of the access-request mediating portion 106 in detail in the first embodiment, in the overall configuration of a memory device control system in FIG. 1. Explanation will be made by affixing the same symbols to the same constituent elements as those in FIG. 1.

In FIG. 2, the file system 103 and the file system 105 issue access requests 206 and 207 to the access-request mediating portion 106 respectively. Also, 209 and 210 are device access requests that are issued from the access-request mediating portion 106 to the device control portions 108 and 104 respectively. Also, 208 is a process end signal, and is delivered to the access-request mediating portion 106 when the process in the device control portion 108 or 104 is ended.

According to such configuration, when two tasks 101 and 102 intend to access simultaneously the data area 109 and the data area 107 in two different areas, the control method of which is different, on one memory device 110 respectively, the access-request mediating portion 106 provided prior to the device control portions 108 and 104 switches the device access requests 209 and 210 to prevent simultaneous accesses to the device, which makes parallel operations of two tasks possible.

The access-request mediating portion 106 is composed of an access information portion 201 and an access processing portion 202. In addition, the access information portion 201 consists of an access information table 203, a task counter 204, and an access pointer table 205.

The access information table 203 is a table that manages information fed from the file system 103 and the file system 105. The access-request mediating portion 106 has a function of subdividing a quantity of data that are subjected to the access request arbitrarily up to one sector at a minimum, and then switching the device access requests 209 and 210 to issue to the device control portion 108 or 104.

According to this function, operations of different tasks 101 and 102 become compatible to enhance a real time characteristic. In other words, if the access-request mediating portion 106 does not wait the end of the memory device access by the task but the end of one subdivided unit of the memory device access in the task, such portion can switch the access to the different file systems. As a result, it appears as if the access-request mediating portion 106 is receiving the accesses issued from two file systems in real time. The way of deciding the number of subdivided access sector units will be described later.

FIG. 3 is a view showing a configuration of attached information of the access requests 206, 207 in the first embodiment, 301 is an access-starting sector number and 302 is the number of access sectors. The access-starting sector number 301 is the head sector number of a sector block on the memory device 110 that the access request 206 or 207 wants to access. The number of access sectors 302 is the number of sectors in the sector block that the access request 206 or 207 wants to access.

FIG. 4 is a view showing a configuration of the access information table 203 in the first embodiment. In FIG. 4, 404 is access demandant information, and holds the file system information that issued the access requests 206, 207.

Then, 402 is access-starting sector numbers. When the access requests 206, 207 are generated, the access-starting sector number 301 is set to one of the access-starting sector numbers 402 as the initial value. Then, the number is added thereto by the number of access sector units, described later, every time when the device access request 209 or 210 is issued to the device control portions 108 and 104 from the task.

Then, 403 is the numbers of remaining access sectors. When the access requests 206, 207 are generated, the number of access sectors 302 is set to one of the numbers 403 as the initial value. Then, the number is subtracted therefrom by the number of access sector units, described later, every time when the device access request 209 or 210 is issued to the device control portions 108 and 104 from the task. This value is initialized to 0 at the time of starting the system.

In the access information portion 201 in FIG. 2, the task counter 204 manages the number of tasks that the access request currently is accepted. This value is initialized to 0 at the time of starting the system. This counter increments the value every time when the access request of the new task is accepted, and decrements the value when one of the remaining access sector numbers 403 in the access information table 203 becomes 0.

Figure 5:
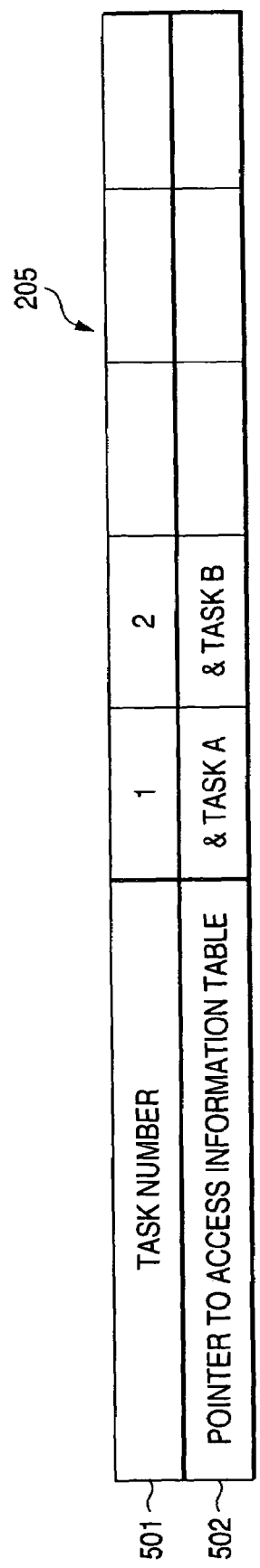
FIG. 5 is a view showing a configuration of an access pointer table in respective embodiments of the present invention.

The access pointer table 205 manages the pointers of respective tasks of which access request have been received, to the access information table 203. FIG. 5 is a view showing a configuration of the access pointer table 205 in the access-request mediating portion in the first embodiment. Here, 501 is the task numbers employed to manage the processing sequence, and 502 is pointers to the access information table.

When the access information portion 201 receives the new access request 206 or 207, it stores the access-starting sector number 301 contained in the access request 206 or 207 of the newly accepted task in the access-starting sector number 402 of the first empty location (location whose remaining access sector number 403 is 0) in the access information table 203, then stores the number of access sectors 302 in the numbers of remaining access sectors 403, and then stores the type of the file system as the access demandant in the access demandant information 404.

In addition, the access information portion 201 increments the task counter 204, and stores the current value of the task counter 204 in a task number 501 of the empty location of the access pointer table 205 and then stores the pointer to the task information stored in the access information table 203 in a pointer 502 to the access information table. Therefore, the value of the task counter 204 coincided with the maximum value of the task number 501 whose columns are occupied in the access pointer table 205.

The access processing portion 202 has a function of issuing the device access requests 209, 210 containing the access-starting sector number 402 and the access sector unit information to the device control portions 108, 104. The access sector unit is the number of the sectors that are actually accessed in the memory device 110 via the device control portions 108, 104. The access processing portion 202 calculates this value in advance based on a calculating formula shown in FIG. 6.

Figure 6:
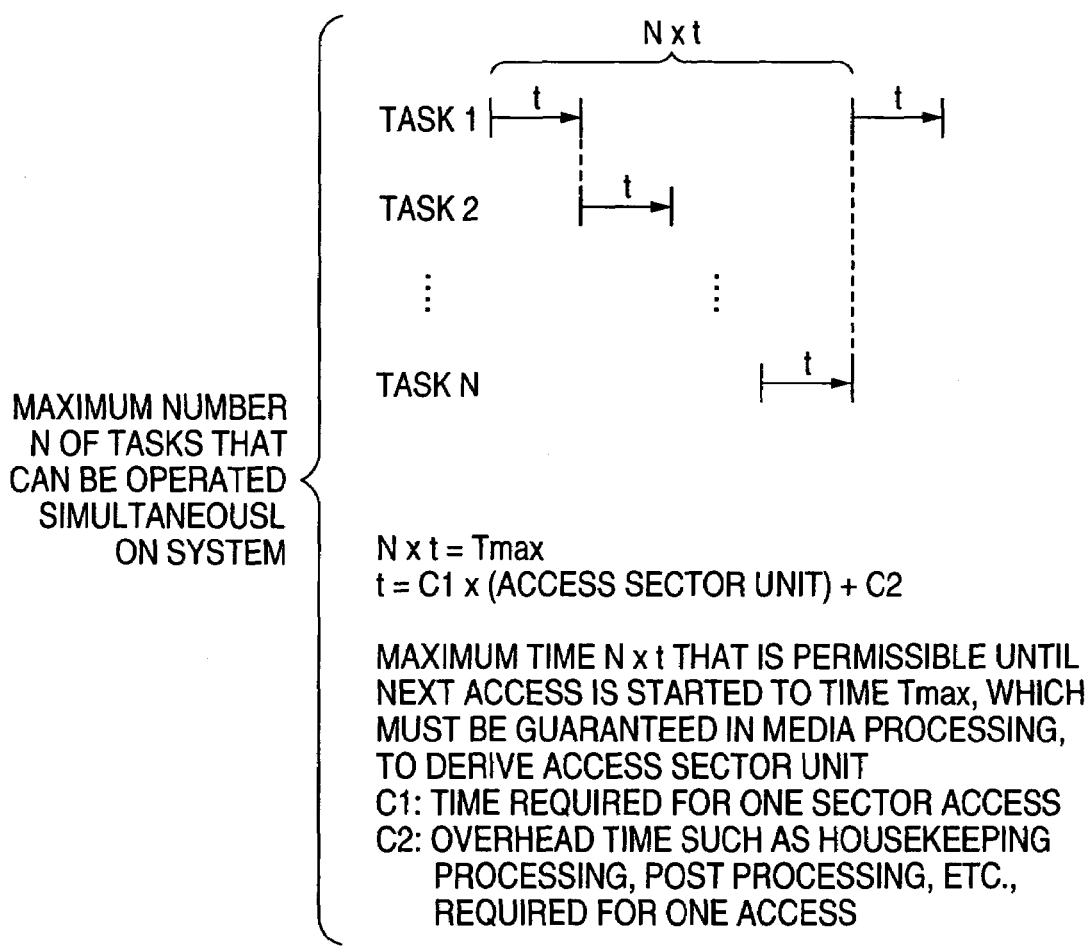
FIG. 6 is a conceptual view of a calculating formula of an access sector unit in the first embodiment of the present invention.

FIG. 6 is a conceptual view explaining a calculating formula of the access sector unit. Assume that the maximum number of tasks that can be operated on the multitask system while maintaining a real time performance is N, the maximum access interval that is permissible in the system is Tmax, a time required to access one predetermined sector is C1, and an overhead time such as preprocessing, postprocessing, etc. required for one access is C2, the access sector unit is calculated by following formulae. Where t is a time that is required to access actually the access sector unit.

$$N \times t = Tmax$$

$$t = C1 \times \text{access sector unit} + C2$$

When the access processing portion 202 receives the access request 206 or 207 from the task, such portion acquires the pointer to the access information table from the access pointer table 205 and then accesses the access information table 203 to get the access-starting sector number 402, the number of remaining access sectors 403, and the access demandant information 404 of the concerned task.

Accordingly, the access processing portion 202 issues the device access request 209 or 210 containing the access-starting sector number 402 and the information of the decided access sector unit to the device control portion 108 or the device control portion 104 corresponding to the access demandant information 404.

When the device control portion 108 or 104 executed actually the access to the memory device 110, the process end signal 208 is sent to the access-request mediating portion 106 when the accessing process is ended. When the access-request mediating portion 106 receives the process end signal 208, such portion repeats the process of issuing the next device access request 209 or 210.

Here, it is assumed that the pointer 502 to the access information table, that the access processing portion 202 acquires from the access pointer table 205, is acquired sequentially from the pointer corresponding to the minimum value of the task number 501. It is restored to the minimum value once again when the task number 501 in which the to-be-acquired pointer is stored reaches the maximum value.

Also, if the acquired remaining access sector number 403 is smaller than the access sector unit, the access sector unit is set to the remaining access sector number 403. When the number of remaining access sectors 403 in the access information table 203 becomes 0, the task counter 204 is decremented and then the process of filling the dead space sequentially is carried out such that the dead task number does not occur in the access pointer table 205.

Figure 7:
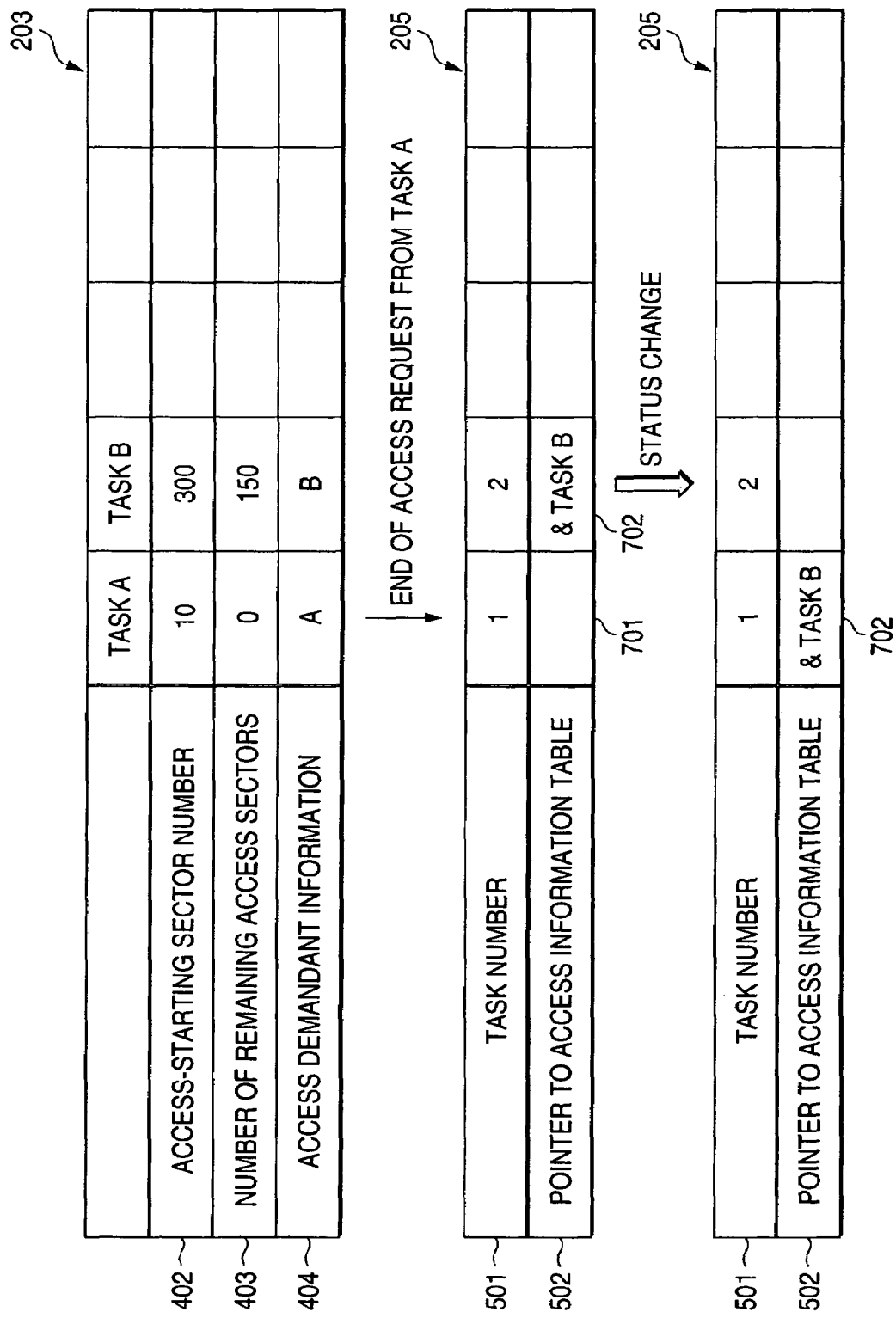
FIG. 7 is a view explaining status changes of the access information table and the access pointer table in the first embodiment of the present invention.

FIG. 7 is a view explaining status changes of the access information table 203 and the access pointer table 205 in this process. In FIG. 7, it is assumed that two tasks of the task A and the task B are being operated. Also, the symbols are similar to those in FIG. 4 and FIG. 5.

When the remaining access sector number 403 of the task A in the access information table 203 becomes 0, a pointer 701 of the task A to the access information table, which is stored in #1 of the task numbers 501 in the access pointer table 205, is cleared. Then, a pointer 702 of the task B to the access information table, which is stored in #2 of the task numbers 501, is shifted to #1 of the task numbers 501. In this manner, the dead space is not generated in the task numbers 501 in the access pointer table 205. Then, the access requests of remaining tasks are processed sequentially.

In this case, the present invention does not limit the method of managing the access request of the task to the above method using the access pointer table. Also, other method that can execute the similar management may be employed.

As described above, the access of one task to the memory device is divided into the access sector unit and is processed. Therefore, even when the accesses to different areas of the memory device having a plurality of data areas that are operated by the different file systems conflict with each other, the task can be switched not to wait until the access of one task is ended, and thus data processings that require plural file systems respectively to process can be carried out in parallel. Also, it is possible to make the tasks such as the media processing, etc., which need a real time characteristic, exist together.

Also, in the present embodiment, if the task having the shortest allowable access interval time is selected previously from the tasks that must be operated in the multitask system and then the allowable access interval of the task is set to Tmax, all the tasks can be operated in parallel not to disturb the operation of all tasks, e.g., the media processing, etc.

In this case, in the present embodiment explained in the above, the case where the number of tasks is 2 and the number of different areas in the memory device control method is 2 is shown. But the present invention does not limit the number of tasks and the number of areas to the above. This is similarly true of the explanation in following embodiments.

Next, a system for controlling the memory device having a plurality of areas in a second embodiment of the present invention will be explained with reference to FIG. 8 to FIG. 12 hereunder. Also, explanation will be made by affixing the same symbols to the constituent elements that operates similarly in FIG. 1 to FIG. 5.

Figure 8:
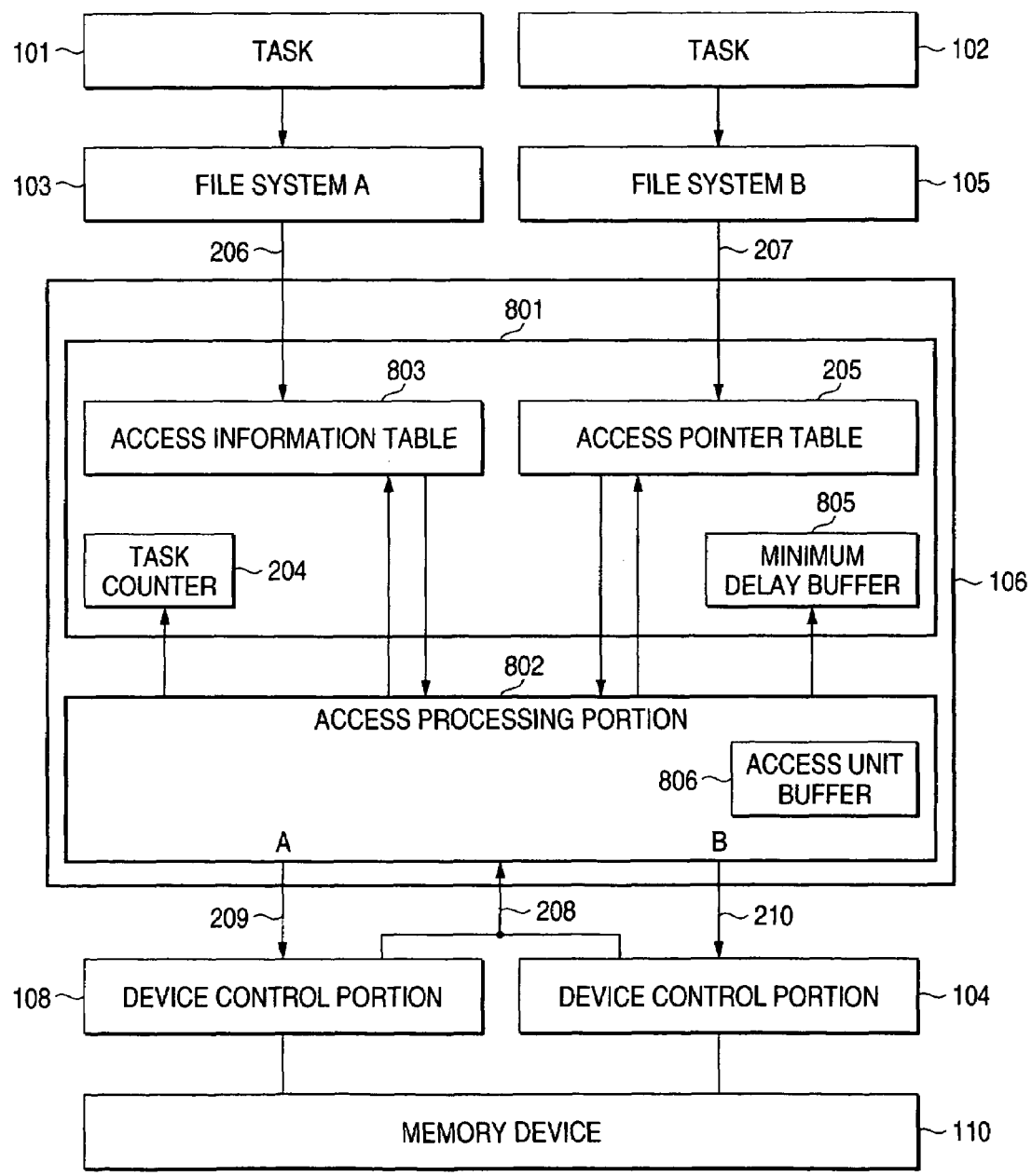
FIG. 8 is a block diagram showing a configuration of an access-request mediating portion according to a second embodiment of the present invention.

FIG. 8 is a block diagram showing a configuration of the access-request mediating portion 106 in detail in the second embodiment, in the overall configuration of the memory device control system in FIG. 1. In FIG. 8, the access-request mediating portion 106 is composed of an access information portion 801 and an access processing portion 802. In addition, the access information portion 801 consists of an access information table 803, the task counter 204, the access pointer table 205, and a minimum delay buffer 805. Also, an access unit buffer 806 for storing the present access sector unit is put in the access processing portion 802.

The access information table 803 is a table that manages attached information of the access requests 206, 207. FIG. 9 is a view showing a configuration of attached information of the access requests 206, 207 in the second embodiment. An allowable delay value 903 is newly provided in addition to the access-starting sector number 301 and the number of access sectors 302. The allowable delay value 903 indicates a maximum allowable time of the access interval to the memory device 110.

The minimum value of the allowable delay value 903 of the task that issues currently the access request is stored in the minimum delay buffer 805. A predetermined initial value is set at the time of starting the system.

Figure 10:
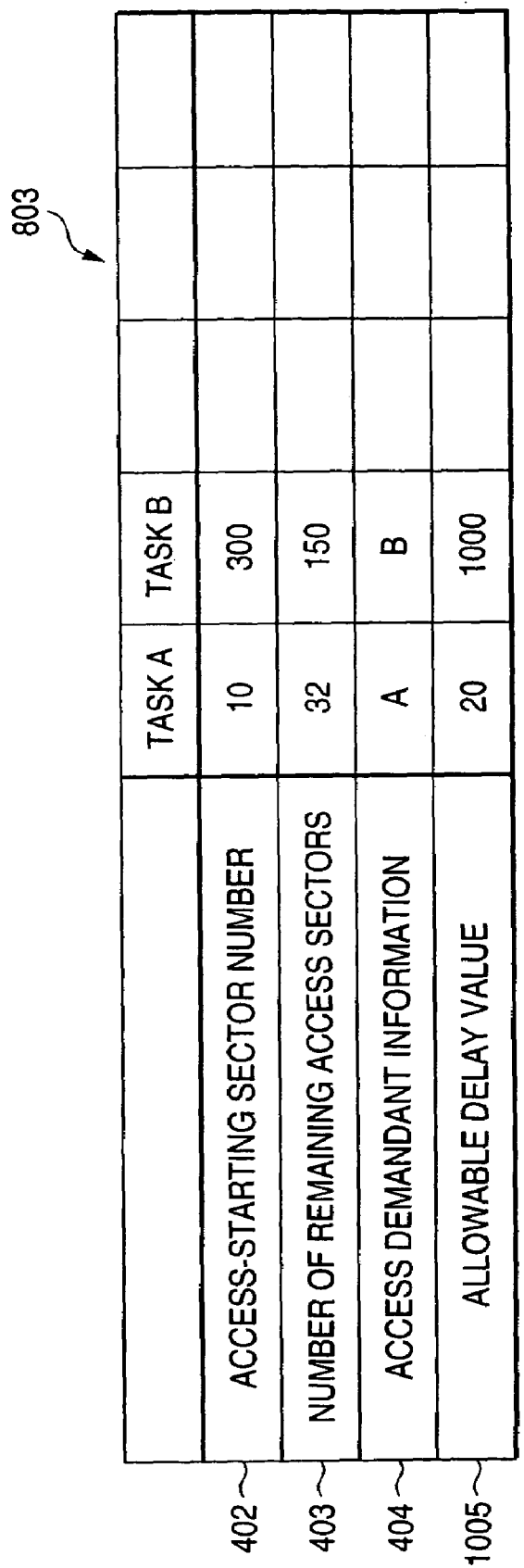
FIG. 10 is a view showing a configuration of an access information table in the second embodiment of the present invention.

FIG. 10 is a view showing a configuration of the access information table 803 in the second embodiment. The access information table 803 includes the access-starting sector numbers 402, the numbers of remaining access sectors 403, the access demandant information 404, and an allowable delay values 1005 that hold the allowable delay values 903 of each task.

The access-starting sector number 301 is set in the access-starting sector numbers 402 as the initial value when the access request 206 or 207 is issued. The number is added by the number of access sector units every time when the device access request 209 or 210 from the task is issued to the device control portion 108 or 104.

The number of access sectors 302 is set in the number of remaining access sectors 403 as the initial value when the access request 206 or 207 is issued. The number is subtracted by the number of access sector units every time when the device access request 209 or 210 from the task is issued to the device control portion 108 or 104. This value is initialized to 0 at the time of starting the system.

When the access information portion 801 receives the access request 206 or 207, such portion stores the access-starting sector number 301, which is the information added to the access request 206 or 207 of the newly accepted task, in the access-starting sector numbers 402 of the access information table 803, stores the number of access sectors 302 in the numbers of remaining access sectors 403, stores the allowable delay value 903 in the allowable delay values 1005, and stores the type of the file system of the access demandant in the access demandant information 404.

Also, the access information portion 801 increments the task counter 204, and stores the current value of the task counter 204 in the first empty location of the task number 501 in the access pointer table 205 and stores the pointer to the task information, which is stored in the access information table 803, in the pointer 502 to the access information table.

In addition, the access information portion 801 compares the allowable delay value 903 contained in the attached information of the access request 206 or 207 with the value in the minimum delay buffer 805, and then updates this value in the minimum delay buffer 805 with the allowable delay value 903 if the former is smaller than the latter.

The access processing portion 802, after receives the access request, issues the access-starting sector number 402 and the device access request 209 or 210 containing the access sector unit information to the device control portion 108 or 104. The access sector unit is the number of sectors that are actually accessed in the memory device 110 via the device control portion 108 or 104. The access processing portion 802 calculated the access sector unit based on the calculating formula shown in FIG. 12 and updates the access sector unit if the value of the minimum delay buffer 805 was updated.

Figure 12:
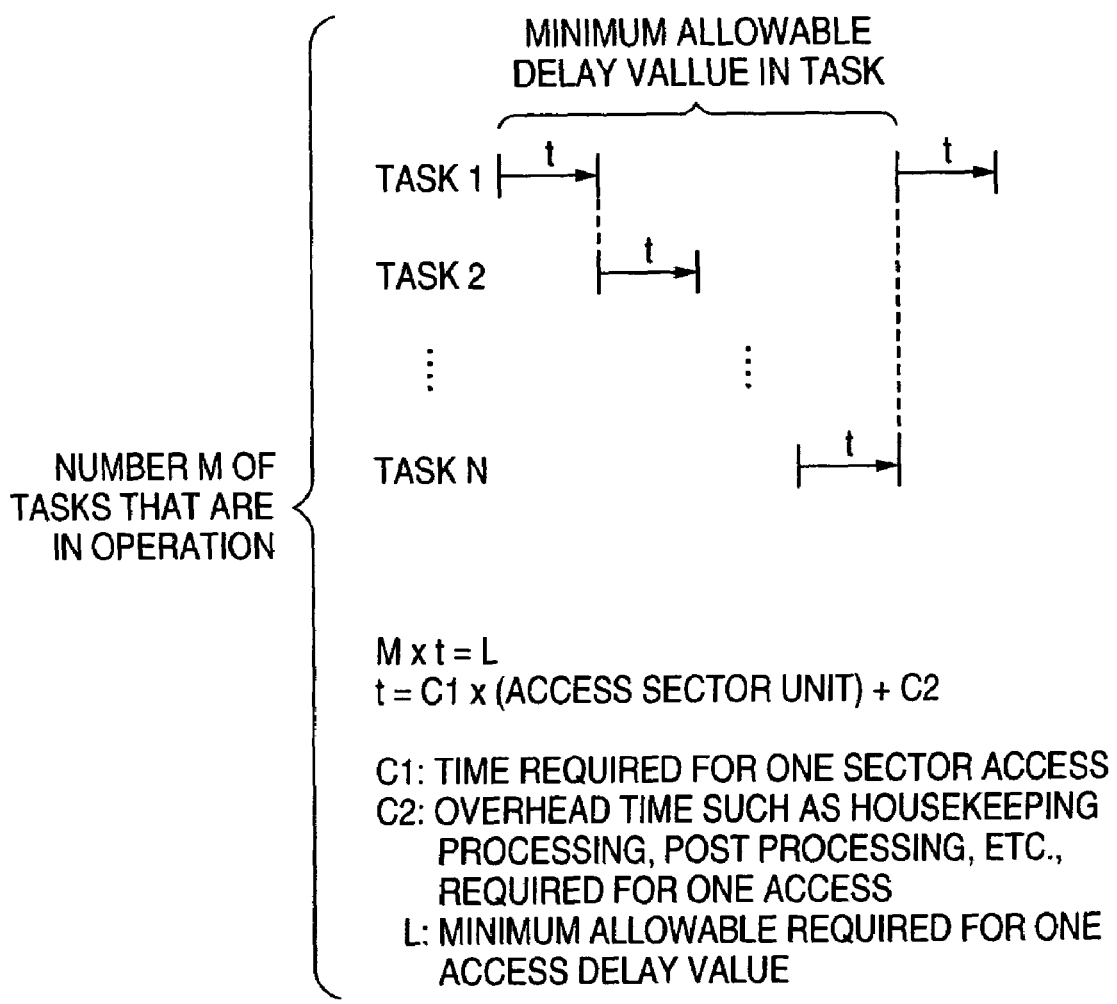
FIG. 12 is a conceptual view of a calculating formula of an access sector unit in the second embodiment of the present invention.

FIG. 12 is a conceptual view explaining a calculating formula of the access sector unit. Assume that the number of the task that is now in operation is M, a value of the minimum delay buffer 805 is L, a time required for the access of one predetermined sector is C1, and an overhead time such as preprocessing, postprocessing, etc. required for one access is C2, the access sector unit can be calculated based on following formulae.

$$M \times t = L$$

$$t = C1 \times \text{access sector unit} + C2$$

When the access processing portion 802 receives the access request 206 or 207 from the task, such potion acquires the pointer 502 to the access information table from the access pointer table 205, and accesses the access information table 803 to get the access-starting sector number 402, the number of remaining access sectors 403, and the access demandant information 404 of the corresponding task.

Accordingly, the access processing portion 802 issues the device access request 209 or 210 containing the access-starting sector number 402 and the information of the access sector unit to the device control portion 108 or 104 corresponding to the access demandant information 404. Here, if the acquired number of remaining access sectors 403 is smaller than the access sector unit calculated in FIG. 12, the access sector unit becomes the number of remaining access sectors 403.

When the device control portion 108 or 104 actually executes the access to the memory device 110, the process end signal 208 is sent to the access-request mediating portion 106 when the accessing process is ended. When the access-request mediating portion 106 receives the process end signal 208, such portion repeats the process of issuing the next device access request 209 or 210.

When one of the numbers of remaining access sectors 403 in the access information table 803 becomes 0, the task counter 204 is decremented and then the process of filling the dead space sequentially is carried out such that the dead task number does not occur in the access pointer table 205.

Figure 11:
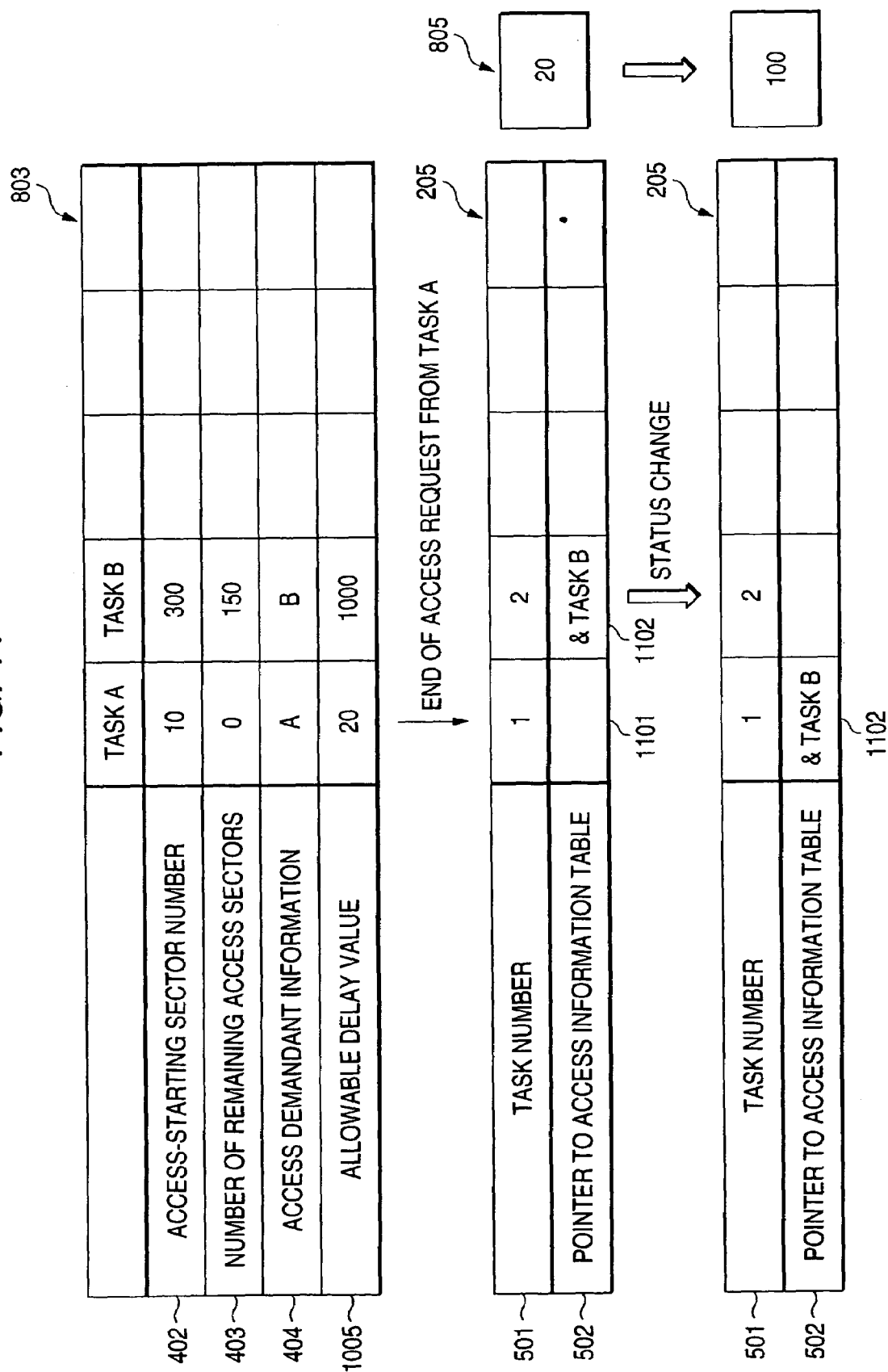
FIG. 11 is a view explaining status changes of the access information table and the access pointer table in the second embodiment of the present invention.

FIG. 11 is a view explaining status changes of the access information table 803 and the access pointer table 205 in this process. In FIG. 11, it is assumed that two tasks of the task A and the task B are being operated. Also, the symbols are similar to those in FIG. 10 and FIG. 5.

When the number of remaining access sectors 403 of the task A in the access information table 803 becomes 0, a pointer 1101 of the task A to the access information table, which is stored in #1 of the task numbers 501 in the access pointer table 205, is cleared. Then, a pointer 1102 of the task B to the access information table, which is stored in #2 of the task numbers 501, is shifted to #1 of the task numbers 501. In this manner, the dead space is not to generated in the task number 501 in the access pointer table 205.

At this time, if the allowable delay value 1005 of the task that ends the access process is equal to the value in the minimum delay buffer 805, the minimum allowable delay value 1005 out of remaining tasks is extracted newly from the access information table 803 and then this value is stored in the minimum delay buffer 805. Then, the access requests of remaining tasks are processed sequentially. After the access processes of all the tasks are ended, the minimum delay buffer 805 is updated to the initial value if no valid information exists in the access information table 803.

As described above, the same advantages as those in the first embodiment can be achieved in the second embodiment. Also, if the access sector unit is calculated dynamically from the allowable delay value 1005 of all the tasks that are now in operation, the access sector unit can be varied to meet to the task that is currently in operation, and also two tasks can be operated in parallel more effectively.

In this case, in respective first and second embodiments, the access time C1 per one sector to the data area of the memory device 110 may be acquired when the access sector unit is calculated, and then the access sector unit may be derived based on respective calculating formulae by using the acquired C1 in calculation. When the data areas of the memory device 110 are changed, the access time C1 per one sector in such data areas may be acquired again and then the access sector unit may be derived based on the calculating formulae.

In other words, the access time C1 per one sector is not provided previously, and such access time is acquired from the device every time when the data areas to be accessed are changed. According to this approach, even if an access speed per one sector becomes different dependent on the memory device or the data areas of the memory device, the memory device can be controlled more effectively without loss by calculating the access sector unit to fit to the access speed.

Next, a memory device control system having a plurality of areas in a third embodiment of the present invention will be explained with reference to FIG. 13 to FIG. 16 hereunder. Also, explanation will be made by affixing the same symbols to the constituent elements that operates similarly in FIG. 1 to FIG. 5.

Figure 13:
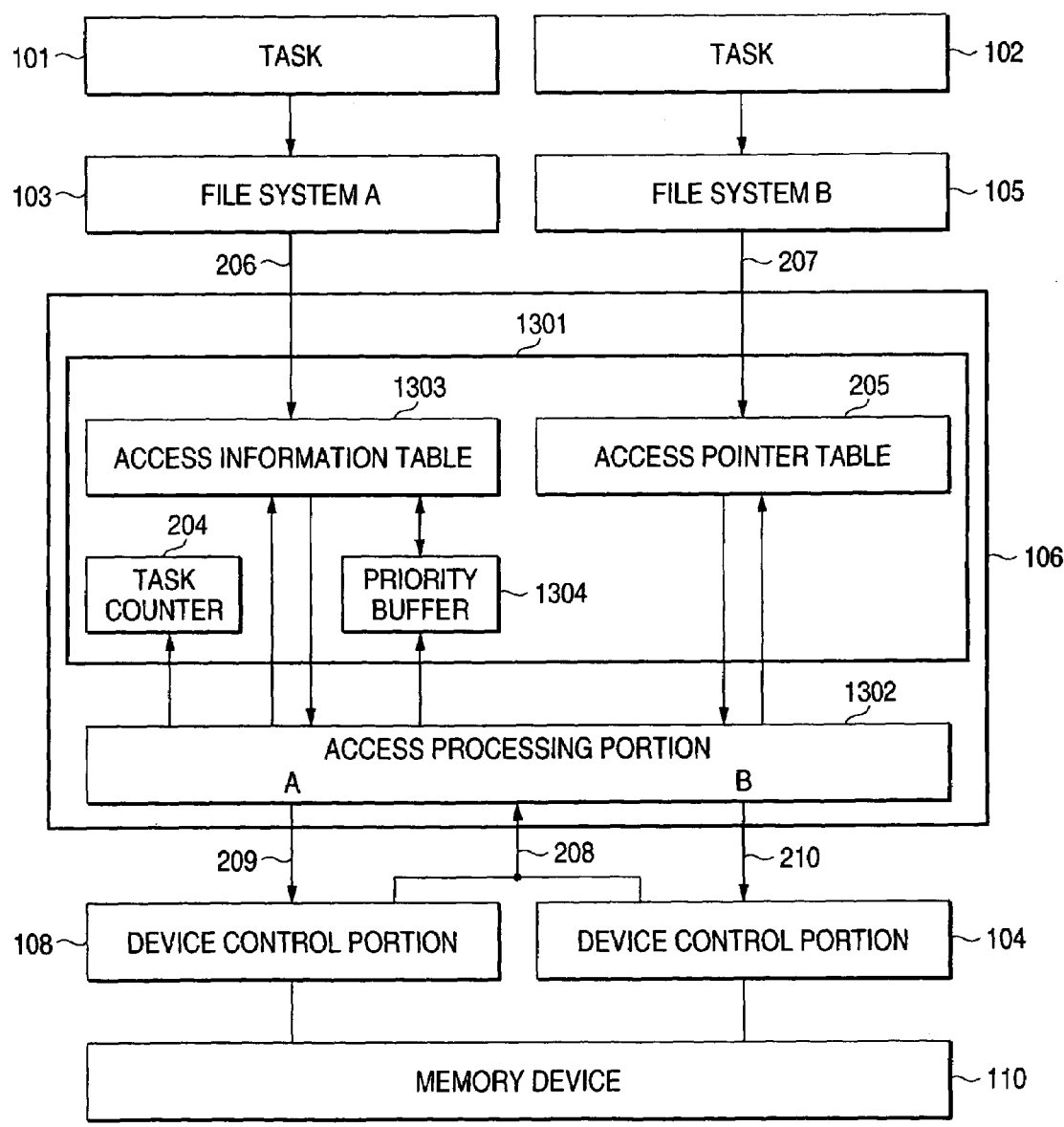
FIG. 13 is a block diagram showing a configuration of an access-request mediating portion according to a third embodiment of the present invention.

FIG. 13 is a block diagram showing a configuration of the access-request mediating portion 106 in detail in the third embodiment, in the overall configuration of the memory device control system in FIG. 1. In FIG. 13, the access-request mediating portion 106 is composed of an access information portion 1301 and an access processing portion 1302. In addition, the access information portion 1301 consists of an access information table 1303, the access pointer table 205, the task counter 204, and a priority buffer 1304.

The access information table 1303 is a table that manages attached information of the access requests 206, 207. FIG. 14 is a view showing a configuration of attached information of the access requests 206, 207 in the third embodiment. Priority information 1403 is newly provided in addition to the access-starting sector number 301 and the number of access sectors 302.

The priority information 1403 indicates priorities of the access requests 206, 207 of the task. Stages of 0 to 255 can be set as the priority, and assume that 0 indicates the highest priority. The priority buffer 1304 is such a buffer that stores the priority information of the current task that is now accessing the memory device 110. An initial value is set at the time of starting the system.

FIG. 15 is a view showing a configuration of the access information table 1303 in the third embodiment. The access information table 1303 includes the access-starting sector numbers 402, the numbers of remaining access sectors 403, the access demandant information 404, and a priority information 1505 that holds the priority information 1403 of each task.

When the access information portion 1301 receives the access request 206 or 207, such portion stores the access-starting sector number 301, which is the information added to the access request 206 or 207 of the newly accepted task, in the access-starting sector numbers 402 of the access information table 1303, stores the number of access sectors 302 in the numbers of remaining access sectors 403, stores the priority information 1403 in the priority information 1505, and stores the type of the file system of the access demandant in the access demandant information 404.

Also, the access information portion 1301 increments the task counter 204, and stores the current value of the task counter 204 in the first dead location of the task number 501 in the access pointer table 205 and stores the pointer to the task information, which is stored in the access information table 1303, in the pointer 502 to the access information table.

In addition, the access information portion 1301, when receives the access request 206 or 207 from the file system 103 or 105, compares the priority information 1403 contained in the attached information of the access request 206 or 207 with the value in the priority buffer 1304, and then updates this value in the priority buffer 1304 into the priority information 1403 if the former is smaller than the latter.

The access processing portion 1302 issues the device access request 209 or 210 containing the access sector unit information to the device control portion 108 or 104. The access processing portion 1302 selects a task, which has the same priority information 1505 as the value in the priority buffer 1304, from the access information table 1303, and then issues the device access request to the device control portion 108 or 104. If tasks having the same priority exist on the access information table 1303, the task having the smaller task number 501 in the access pointer table 205 is selected.

The access sector unit is the number of sectors that are actually accessed in the memory device 110 via the device control portion 108 or 104. The device access request 209 or 210 using the value of the number of remaining access sectors 403 of the access request of the selected task as the access sector unit is issued. After the access request is issued, the value of the number of remaining access sectors 403 of the corresponding task is set to 0.

When the device control portion 108 or 104 actually executes the access to the memory device 110, the process end signal 208 is sent to the access-request mediating portion 106 when the accessing process is ended. When the access-request mediating portion 106 receives the process end signal 208, such portion repeats the process of issuing the next device access request 209 or 210.

When one of the numbers of remaining access sectors 403 in the access information table 803 becomes 0, the task counter 204 is decremented and then the process of filling the dead space sequentially is carried out such that the dead task number does not occur in the access pointer table 205.

Figure 16:
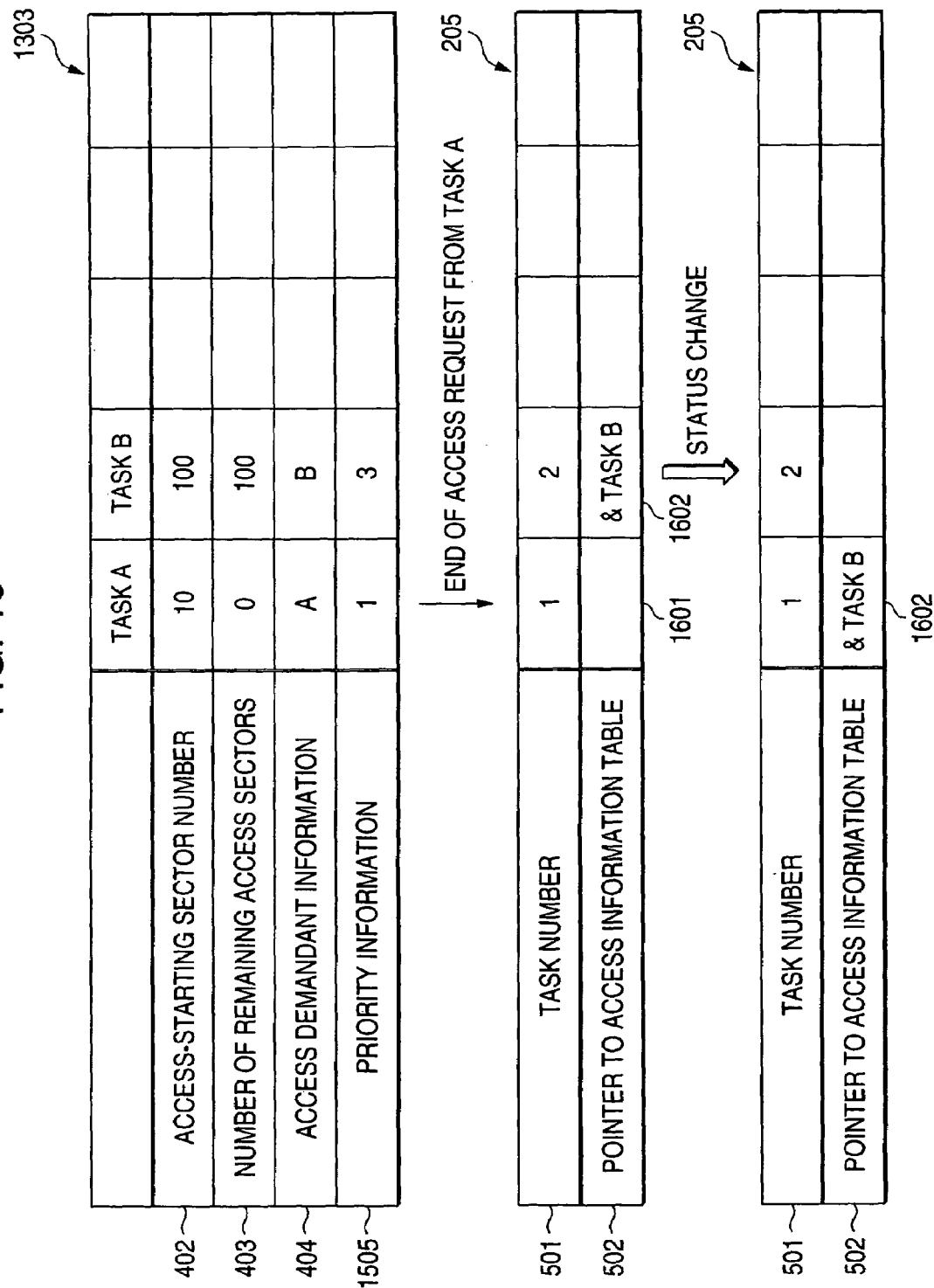
FIG. 16 is a view explaining status changes of the access information table and the access pointer table in the third embodiment of the present invention.

FIG. 16 is a view explaining status changes of the access information table 1303 and the access pointer table 205 in this process. In FIG. 16, it is assumed that two tasks of the task A and the task B are being operated. Also, the symbols are similar to those in FIG. 15 and FIG. 5.

When the number of remaining access sectors 403 of the task A in the access information table 1303 becomes 0, a pointer 1601 of the task A to the access information table, which is stored in #1 of the task number 501 in the access pointer table 205, is cleared. Then, a pointer 1602 of the task B to the access information table, which is stored in #2 of the task number 501, is shifted to #1 of the task number 501. In this manner, the dead space is not generated in the task number 501 in the access pointer table 205.

At this time, the next higher priority is extracted newly from the available access information table 1303 and then this value is stored in the priority buffer 1304. Then, the access requests of remaining tasks are processed in sequence. After the access processes of all the tasks are ended, the priority buffer 1304 is updated to the initial value if no effective information exists in the access information table 1303.

As described above, in the third embodiment, the effect attained by the task subdivision in the first and second embodiments cannot be obtained. However, since the priority is assigned to the task that receives the access request, the access of the task can be always processed preferentially if the task that is accessed absolutely preferentially is present. It is of course that, if the third embodiment is combined with the first and second embodiments, it is possible to process preferentially the task having the higher priority while achieving the effect of the task subdivision.

Next, a system for controlling the memory device having a plurality of areas in a fourth embodiment of the present invention will be explained with reference to FIG. 17 hereunder. Also, explanation will be made by affixing the same symbols to the constituent elements that operates similarly in FIG. 1 and FIG. 2.

Figure 17:
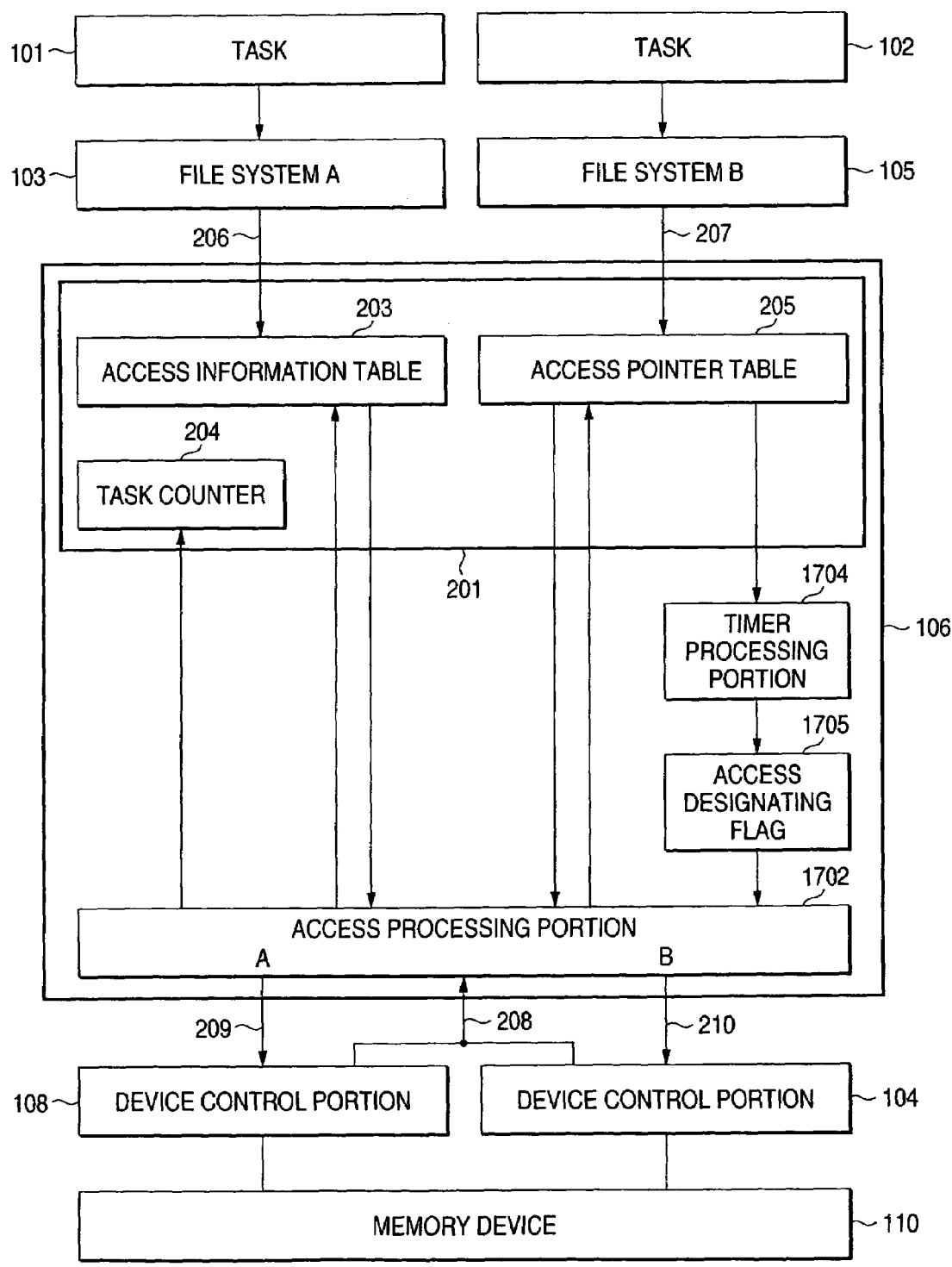
FIG. 17 is a block diagram showing a configuration of an access-request mediating portion according to a fourth embodiment of the present invention.

FIG. 17 is a block diagram showing a configuration of the access-request mediating portion 106 in detail in the fourth embodiment, in the overall configuration of the memory device control system in FIG. 1. In FIG. 17, the access-request mediating portion 106 is composed of the access information portion 201, an access processing portion 1702, a timer processing portion 1704, and an access designating flag 1705. The access information portion 201 is identical to that in the first embodiment, and consists of the access information table 203, the access pointer table 205, and the task counter 204.

When the access information portion 201 receives the access request 206 or 207, it stores the access-starting sector number 301 contained in the access request of the newly accepted task in the access-starting sector numbers 402 in the access information table 203, then stores the number of access sectors 302 in the numbers of remaining access sectors 403, and then stores the type of the file system of the access demandant in the access demandant information 404.

The timer processing portion 1704 is a processing portion that is started every t time of the time slice value that is previously designated. The access designating flag 1705 stores the task number 501 of the task that is accessed next. When the timer processing portion 1704 is started every t time, such portion acquires the task number 501 from the access pointer table 205 and then stores the task number 501 in the access designating flag 1705.

Here, it is assumed that the pointer 502 to the access information table, which is acquired from the access pointer table 205, is acquired sequentially from the pointer corresponding to the minimum value of the task number 501, and it is restored to the minimum value once again when the task number 501 in which the to-be-acquired pointer is stored reaches the maximum value.

The access processing portion 1702 acquires the pointer 502 to the access information table from the access pointer table 205 that corresponds to the task number 501 stored in the access designating flag 1705, and also acquires the access-starting sector number 402, the number of remaining access sectors 403, and the access demandant information 404 from the access information table 203.

The access sector unit is the number of sectors that access actually the memory device 110 via the device control portion 108 or 104. The access sector unit is prepared every one sector. When the access designating flag is varied after a t time has lapsed, the access to the next task can be started immediately after the process end signal 208 is received.

Then, the access processing portion 1702 issues the access-starting sector number 402 and the device access request 209 or 210 containing the information of the access sector unit to the device control portion 108 or 104 corresponding to the access demandant information 404.

When the device control portion 108 or 104 actually executes the access to the memory device 110, the process end signal 208 is sent to the access-request mediating portion 106 when the accessing process is ended. When the access-request mediating portion 106 receives the process end signal 208, such portion checks the access designating flag 1705, and repeats the process of issuing the device access request 209 or 210 that corresponds to the task number 501 stored in the access designating flag 1705.

As described above, the switching of the task can be carried out for a constant time without fail by utilizing the timer in switching the task. For example, even though the access to the memory device is interrupted temporarily during the access of the task to the memory device because of the influences caused when the CPU is allocated to other process, etc., the process can be shifted to the next task forcedly after a predetermined time has lapsed.

Next, a system for controlling the memory device having a plurality of areas in a fifth embodiment of the present invention will be explained with reference to FIG. 18 to FIG. 20 hereunder. Also, explanation will be made by affixing the same symbols to the constituent elements that operates similarly in FIG. 1 to FIG. 5.

Figure 18:
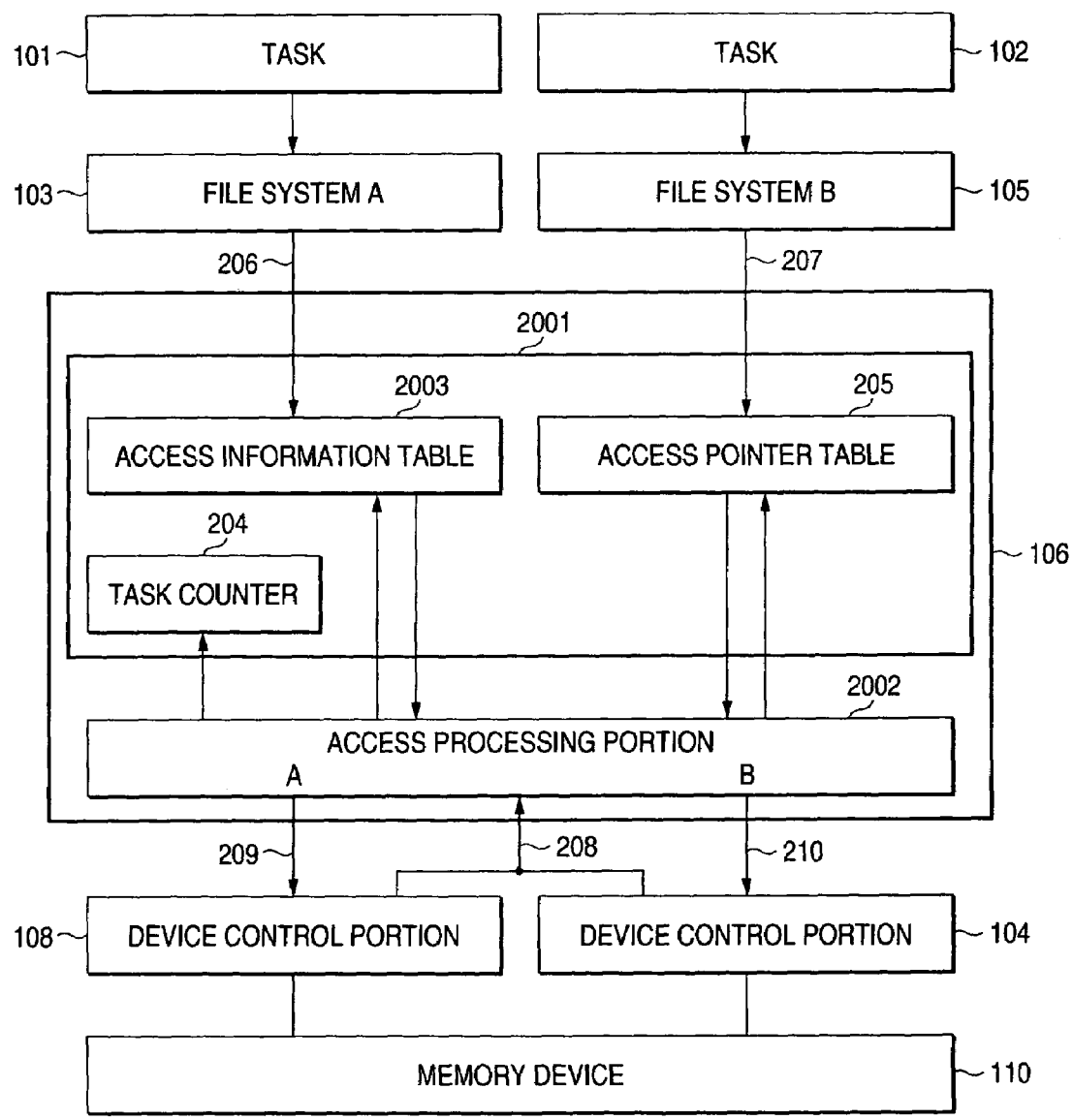
FIG. 18 is a block diagram showing a configuration of an access-request mediating portion according to a fifth embodiment of the present invention.

FIG. 18 is a block diagram showing a configuration of the access-request mediating portion 106 in detail in the fifth embodiment, in the overall configuration of the memory device control system in FIG. 1. In FIG. 18, the access-request mediating portion 106 is composed of an access information portion 2001 and an access processing portion 2002. In addition, the access information portion 2001 consists of an access information table 2003, the task counter 204, and the access pointer table 205.

The access information table 2003 is a table that manages attached information of the access requests 206, 207. FIG. 19 is a view showing a configuration of attached information of the access requests 206, 207 in the fifth embodiment. An access sector unit number 2103 is newly provided in addition to the access-starting sector number 301 and the number of access sectors 302. The number of access sector units 2103 indicates the access sector unit that is designated by the task.

FIG. 20 is a view showing a configuration of the access information table 2003 in the fifth embodiment. The access information table 2003 includes the access-starting sector numbers 402, the numbers of remaining access sectors 403, the access demandant information 404, and an access sector unit numbers 2204 that hold the numbers of access sector units 2103 that are designated by each task.

The access-starting sector number 301 is set in the access-starting sector numbers 402 as the initial value when the access request 206 or 207 is issued. The number is added by the number of access sector units every time when the device access request 209 or 210 is issued to the device control portion 108 or 104 from the task.

The access sector number 302 is set in the remaining access sector numbers 403 as the initial value when the access request 206 or 207 is issued. The number is subtracted by the number of access sector units every time when the device access request 209 or 210 is issued to the device control portion 108 or 104 from the task. This value is initialized to 0 at the time of starting the system.

When the access information portion 2001 receives the access request 206 or 207, such portion stores the access-starting sector number 301, which is the information contained in the access request of the newly accepted task, in the access-starting sector numbers 402 of the access information table 2003, stores the number of access sectors 302 in the numbers of remaining access sectors 403, stores the number of access sector units 2103 in the numbers of access sector units 2204, and stores the type of the file system of the access demandant in the access demandant information 404.

Also, the access information portion 2001 increments the task counter 204, and stores the current value of the task counter 204 in the first dead location of the task number 501 in the access pointer table 205 and stores the pointer to the task information, which is stored in the access information table 203, in the pointer 502 to the access information table.

When the access processing portion 2002 receives the access request 206 or 207 from the task, such portion acquires the pointer 502 to the access information table from the access pointer table 205, and accesses the access information table 2003 to get the access-starting sector number 402, the number of remaining access sectors 403, the access demandant information 404, and the number of access sector units 2204 of the concerned access request. If the acquired remaining access sector number 403 is smaller than the acquired access sector unit number 2204, the access sector unit becomes the remaining access sector number 403.

Here, the pointer 502 to the access information table, which is acquired by the access processing portion 2002 from the access pointer table 205, is acquired sequentially from the pointer corresponding to the minimum value of the task number 501, and it is restored to the minimum value once again when the task number 501 in which to-be-acquired pointer is stored reaches the maximum value.

Accordingly, the access processing portion 2002 issues the access-starting sector number 402 and the device access request 209 or 210 containing the information of the access sector unit to the device control portion 108 or 104 corresponding to the access demandant information 404.

When the device control portion 108 or 104 actually executes the access to the memory device 110, the process end signal 208 is sent to the access-request mediating portion 106 when the accessing process is ended. When the access-request mediating portion 106 receives the process end signal 208, such portion repeats the process of issuing the device access request 209 or 210.

As described above, since the access task unit is designated every task, the access task unit can be designated according to the application of the task, and thus the task design with a wide margin can be achieved.

The present invention can exhibit the effect particularly in case at least one area of a plurality of data areas is the secured area and at least one area is the unsecured area. This is because the control method becomes different in the secured area and the unsecured area and also both the file system corresponding to the secured area and the file system corresponding to the unsecured area are required as the file system.

The present invention can exhibit the effect particularly in case a plurality of tasks that are carried out simultaneously are the task that requires a high real-time characteristic. This is because it is important that the task that requires a high real-time characteristic must be executed not to interrupt. More particularly, The present invention is particularly effective in playing the audio data.

Also, it is desired from a viewpoint of the copyright protection that the audio data should be stored in the secured area. In this case, the browser, etc., for example, are stored in the unsecured area.

Also, from a viewpoint of handling the data that is protected by the copyright and requires a high real-time characteristic, it is further desired that the present invention should correspond to the SD card as the memory device.

With the above, preferred embodiments and other embodiments of the present invention are explained. The present invention is not limited to these embodiments, and contains various variations and modifications that are thought of by the skilled person in the art. That is, the present invention is not limited by details of the above embodiments, but should be limited only by recitations in Claims.

As described above, according to the present invention, such excellent advantages can be achieved that, even if a plurality of tasks that access a plurality of data areas each having the different control method are operated in parallel and the access requests are generated almost simultaneously, the simultaneous accesses to the memory device can be prevented and also a plurality of tasks can be operated in parallel while maintaining a real-time characteristic since the access requests contained in the tasks are divided into partial request units by the access-request mediating portion to switch the access requests.

What is claimed is:

1. A memory device control device for accessing a memory device having a plurality of data areas that require a different control method, comprising:
   a plurality of different file systems, provided to respond to each of the plurality of data areas to control tasks containing access requests to files in the data areas;
   a plurality of device control portions, provided to respond to each of the plurality of data areas to accept the access requests and access the memory device; and
   an access-request mediating portion, which divides the access requests into sector units of partial requests and mediates the access of every partial request, when a plurality of tasks containing the access requests are executed simultaneously.

2. The memory device control device according to claim 1, wherein, when the access requests are divided into partial requests, the access requests are divided into predetermined split sizes for S sectors (S is an integer).

3. The memory device control device according to claim 2, wherein a number S of sectors in split size is calculated by $$T_{max}/N = C1 \times S + C2$$

where N (N is an integer of 2 or more) is a maximum number of tasks tat are operated simultaneously, Tmax is a predetermined allowable maximum access delay time, C1 is an estimated time required to access one sector, and C2 is an estimated time required for an overhead of accessing one sector.

4. The memory device control device according to claim 1, wherein, when the access requests are divided into partial requests, the access requests are divided into calculated split sizes by looking up allowable access delay times that are set every task.

5. The memory device control device according to claim 4, wherein a number S of sectors in split size is calculated by $$L/M = C1 \times S + C2$$

where M (M is an integer of 2 or more) is a number of tasks that are operated simultaneously, L is a minimum value of allowable access delay times that are set every M tasks, C1 is an estimated time required to access one sector, and C2 is an estimated time required for an overhead of one access.

6. The memory device control device according to claim 3, wherein, when the access requests are divided into partial requests, the access-request mediating portion acquires a value of the estimated time C1 required to access one sector every data area and then calculates the split size S by using the value of the acquired C1.

7. The memory device control device according to claim 5, wherein, when the access requests are divided into partial requests, the access-request mediating portion acquires a value of the estimated time C1 required to access one sector every data area and then calculates the split size S by using the value of the acquired C1.

8. The memory device control device according to claim 1, wherein, when the access requests are divided into partial requests, the access requests are divided in unit of a predetermined time.

9. The memory device control device according to claim 1, wherein, when the access requests are divided into partial requests, the access requests are divided into access sizes that are set every task.

10. The memory device control device according to claim 1, wherein the access-request mediating portion accesses the memory device in order of priorities that are allocated to respective tasks.

11. The memory device control device according to claim 1, wherein at least one of the file systems corresponds to secured data areas and at least one of the file systems corresponds to unsecured data areas.

12. The memory device control device according to claim 1, wherein one of the plurality of tasks is playing of audio data.

13. The memory device control device according to claim 1, wherein a secure digital card (SD card) as the memory device can accessed.

14. A memory device control method for accessing a memory device having a plurality of data areas that require a different control method, comprising the steps of:
controlling tasks containing access requests to files in the data areas;
accepting the access requests;
accessing the memory device;
dividing the access requests into sector units of partial requests and mediating the access of every partial request, when a plurality of tasks containing the access requests are executed simultaneously.

15. The memory device control method according to claim 14, wherein the dividing the access requests into partial requests comprising the step of:
dividing the access requests into predetermined split sizes for S sectors (S is an integer).

16. The memory device control method according to claim 14, wherein the dividing the access requests into partial requests comprising the step of:
dividing the access requests into calculated split sizes by looking up allowable access delay times that are set every task.

17. The memory device control method according to claim 14, wherein the dividing the access requests into partial requests comprising the step of:
dividing the access requests in unit of a predetermined time.

18. The memory device control method according to claim 14, wherein the dividing the access requests into partial requests comprising the step of:
dividing the access requests into access sizes that are set every task.

19. A memory device control device for accessing a memory device having a plurality of data areas that require a different control method, comprising:
a plurality of different file systems, provided to respond to each of the plurality of data areas to control tasks containing access requests to files in the data areas;
a plurality of device control portions, provided to respond to each of the plurality of data areas to accept the access requests and access the memory device;
an access-request mediating portion, which mediates the access requests when a plurality of tasks containing the access requests are executed simultaneously;
wherein the access-request mediating portion comprises an access information table for making the access requests to access on sector units; and
wherein the access-request mediating portion divides the access requests into partial requests and mediates the accesses of every partial request.

20. The memory device control device according to claim 19, wherein the access requests are divided into partial requests, the access requests are divided into predetermined split sizes.

21. The memory device control device according to claim 20, wherein a number S of sectors in split size is calculated by $$T\max/N = C1 \times S + C2$$

where N (N is an integer of 2 or more) is a maximum number of tasks that are operated simultaneously, Tmax is a predetermined allowable maximum access delay time, C1 is an estimated time required to access one sector, and C2 is an estimated time required for an overhead of accessing one sector.

22. The memory device control device according to claim 19, wherein, when the access requests are divided into partial requests, the access requests are divided into calculated spilt sizes by looking up allowable access delay times that are set for every task.

23. The memory device control device according to claim 22, wherein a number S of sectors in split size is calculated by $$L/M = C1 \times S + C2$$

where M (M is an integer of 2 or more) is a number of tasks that are operated simultaneously, L is a minimum value of allowable access delay times that are set every M tasks, C1 is an estimated time required to access one sector, and C2 is an estimated time required for an overhead of one access.

24. The memory device control device according to claim 21, wherein, when the access requests are divided into partial requests, the access-request mediating portion acquires a value of the estimated time C1 required to access one sector of every data area and then calculates the split size S by using the value of the acquired C1.

25. The memory device control device according to claim 23, wherein, when the access requests are divided into partial requests, the access-request mediating portion acquires a value of the estimated time C1 required to access one sector of every data area and then calculates the split size S by using the value of the acquired C1.

26. The memory device control device according to claim 19, wherein, when the access requests are divided into partial requests, the access requests are divided in unit of a predetermined time.

27. The memory device control device according to claim 19, wherein, when the access requests are divided into partial requests, the access requests are divided into access sizes that are set every task.

28. The memory device control device according to claim 19, wherein the access-request mediating portion accesses the memory device in order of priorities that are allocated to respective tasks.

29. The memory device control device according to claim 19, wherein at least one of the file systems corresponds to secured data areas and at least one of the file systems corresponds to unsecured data areas.

30. The memory device control device according to claim 19, wherein one of the plurality of tasks is playing of audio data.

31. The memory device control device according to claim 19, wherein a secure digital card (SD card) as the memory device can accessed.

* * * * *